United States Patent
Schomaker et al.

(10) Patent No.: US 9,296,902 B2
(45) Date of Patent: Mar. 29, 2016

(54) PROCESS FOR MODIFYING INORGANIC OXYGEN-CONTAINING PARTICULATE MATERIAL, PRODUCT OBTAINED THEREFROM, AND USE THEREOF

(75) Inventors: Elwin Schomaker, Arnhem (NL); Rudolf Anthonius Maria Venderbosch, Duiven (NL)

(73) Assignee: AKZO NOBEL N.V., Arnhem (NL)

( * ) Notice: Subject to any disclaimer, the term of this patent is extended or adjusted under 35 U.S.C. 154(b) by 713 days.

(21) Appl. No.: 11/993,785

(22) PCT Filed: Jun. 16, 2006

(86) PCT No.: PCT/EP2006/063284
§ 371 (c)(1),
(2), (4) Date: Dec. 21, 2007

(87) PCT Pub. No.: WO2006/136534
PCT Pub. Date: Dec. 28, 2006

(65) Prior Publication Data
US 2010/0179249 A1    Jul. 15, 2010

Related U.S. Application Data

(60) Provisional application No. 60/713,754, filed on Sep. 6, 2005.

(30) Foreign Application Priority Data

Jun. 21, 2005  (EP) ..................................... 05105435
Jul. 15, 2005  (EP) ..................................... 05106508

(51) Int. Cl.
*C08K 9/00* (2006.01)
*C09D 5/03* (2006.01)
*C08L 71/02* (2006.01)
*C09D 143/04* (2006.01)

(52) U.S. Cl.
CPC ................. *C09D 5/033* (2013.01); *C08L 71/02* (2013.01); *C09D 143/04* (2013.01)

(58) Field of Classification Search
CPC ..................................... C08K 3/20; C08K 5/54
USPC .......................................... 523/209, 200, 205
See application file for complete search history.

(56) References Cited

U.S. PATENT DOCUMENTS

| | | | |
|---|---|---|---|
| 4,054,536 A * | 10/1977 | Schaefer et al. ................ 516/81 |
| 4,330,446 A | 5/1982 | Miyosawa | |
| 4,994,318 A * | 2/1991 | Patel .............................. 428/331 |
| 5,332,779 A | 7/1994 | Mohri et al. | |
| 5,635,548 A * | 6/1997 | Kittle et al. ..................... 523/220 |
| 5,853,809 A | 12/1998 | Campbell et al. | |
| 6,096,835 A | 8/2000 | Vandevoorde et al. | |
| 6,183,935 B1 * | 2/2001 | Hanabata et al. .......... 430/270.1 |
| 6,210,790 B1 * | 4/2001 | Crivello ......................... 428/325 |
| 7,524,606 B2 * | 4/2009 | Chen et al. ................. 430/270.1 |
| 2001/0027223 A1 | 10/2001 | Wilhelm et al. | |
| 2002/0115777 A1 | 8/2002 | Wu et al. | |
| 2003/0035888 A1 | 2/2003 | Eriyama et al. | |
| 2009/0101205 A1 * | 4/2009 | Venderbosch et al. ........ 136/256 |

FOREIGN PATENT DOCUMENTS

| | | |
|---|---|---|
| CN | 1486344 A | 3/2004 |
| CN | 1503728 A | 6/2004 |
| EP | 0 139 187 | 5/1985 |
| EP | 0 588 508 B1 | 5/1997 |
| EP | 0 832 947 | 4/1998 |
| GB | 2 047 721 | 12/1980 |
| JP | 04 202481 | 7/1992 |
| JP | H04-202481 A | 7/1992 |
| JP | 4-254406 A | 9/1992 |
| JP | H06-166829 A | 6/1994 |
| JP | 10-120948 A | 5/1998 |
| JP | 10237348 A | 9/1998 |
| JP | 2001-240769 A | 9/2001 |
| JP | 2004-83307 A | 3/2004 |

(Continued)

OTHER PUBLICATIONS

George W. Sears, "Determination of Specific Surface Area of Colloidal Silica by Titration with Sodium Hydroxide", *Analytical Chemistry*, vol. 28, No. 12, pp. 1981-1983, Dec. 12, 1956.

(Continued)

*Primary Examiner* — Hannah Pak
(74) *Attorney, Agent, or Firm* — Sandra B. Weiss

(57) ABSTRACT

The present invention pertains to a process for preparing a modified inorganic oxygen-containing particulate material comprising the steps of: a) preparing a mixture of an aqueous suspension of inorganic oxygen-containing particulate material and an alkoxylated alcohol according to the formula (I) wherein $R_1$ is a $C_1$-$C_8$ alkyl, $C_4$-$C_8$ cycloalkyl or phenyl, $R_2$ is hydrogen or methyl, and n is an integer from 1 to 5; b) optionally adding a first resin and/or a first resin precursor; c) adding one or more coupling agents to the mixture; d) optionally adding a second resin and/or a second resin precursor to the resulting mixture; and wherein optionally water is removed at least partially from the mixture before or during step b), c) or d), or after step d); and optionally converting the first resin precursor into the first resin before, during or after step c) and/or the second resin precursor into the second resin after step d).

(I)

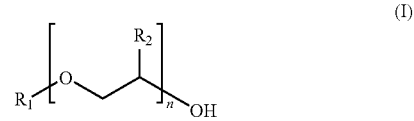

17 Claims, No Drawings

(56) References Cited

FOREIGN PATENT DOCUMENTS

| WO | 94/11446 | 5/1994 |
|---|---|---|
| WO | 99/09036 | 2/1999 |
| WO | 02/083776 | 10/2002 |
| WO | 2004/018115 | 3/2004 |

OTHER PUBLICATIONS

Database WPI, Week 199236, Derwent Publications Ltd., (Abstract for JP 1992-295637).

International Search Report, International Application No. PCT/EP2006/063284, dated Nov. 30, 2006.

JP Office Action for 2008-517472 dated Jan. 17, 2012.

English translation of JP Office Action for 2008-517472 dated Jan. 17, 2012.

English language machine translation for JP10237348A dated Sep. 8, 1998.

English language partial machine translation for JP200483307A dated Mar. 18, 2004.

* cited by examiner

PROCESS FOR MODIFYING INORGANIC OXYGEN-CONTAINING PARTICULATE MATERIAL, PRODUCT OBTAINED THEREFROM, AND USE THEREOF

REFERENCE TO RELATED APPLICATION(S)

This application claims the benefit of U.S. Provisional Application No. 60/713,754 filed on Sep. 6, 2005.

The invention relates to a process for preparing modified inorganic oxygen-containing particulate material.

Such processes are known from U.S. Pat. No. 4,330,446, which describes water-dispersible silica-organic polymer complex compositions consisting of a water-dispersible colloidal silica, a water-soluble or water-dispersible organic polymer resin, and a di- or trialkoxy (or alkoxyalkoxy) silane compound. In a first step the resin is prepared in isopropyl alcohol (IPA), after which water is added to obtain an aqueous dispersion of acrylic polymer resin. To the aqueous dispersion an aqueous dispersion of colloidal silica is added, after which γ-methacryloxypropyl trimethoxy silane is added, while stirring and heating up to 85° C.

In US 2001/0027223 fluid silico-acrylic compositions containing silica, silane, and a multi-functional acrylic monomer are described. These compositions can be prepared by mixing an acid aqueous silica sol-containing silica, a vinyl silane, alkoxylated (meth)acrylate monomer, and isopropyl alcohol, where the monomer is polymerised to form the resin, after which the mixture is distilled to remove water and the alcohol.

EP 1366112 describes a dispersion of silicon dioxide comprising a polymer or polymerisable monomers/oligomers and a disperse phase comprising amorphous silicon dioxide. As an example, a mixture of silica sol, silane, and isopropanol is prepared and stirred at 40° C. and 85 mbar. Subsequently, a hydroxyl-containing polyacrylate is added to the mixture. The resulting mixture is then distilled at 40° C. under reduced pressure.

GB 2047721 describes an aqueous coating composition comprising melamine-formaldehyde resin, a colloidal silica, and a mono-organo trialkoxy or trialkoxyalkoxy-silane in a solvent system consisting of water and a water-miscible organic solvent. This reference describes the preparation of two dispersions: the first comprising colloidal silica and silane, the second comprising a melamine resin which is dissolved in an isopropanol/n-butanol solvent mixture. In a subsequent step the two dispersions are mixed.

US 2003/0035888 discloses a process for preparing hydrophobic colloidal silica by first replacing a substantial amount of water in an aqueous colloidal silica using a membrane with one or more hydrophilic organic solvents, such as methanol, and subsequently reacting the colloidal silica with a hydrolysable silicon compound having at least one alkoxy group or a hydrolysate. The hydrophilic organic solvent from the resulting dispersion is subsequently replaced by a hydrophobic organic solvent.

The processes of the prior art generally use a large amount of organic solvent, which means that the process is conducted at a relatively low product yield per volume unit. This large amount of solvent further requires specific measures for waste stream treatment or recycling, which moreover renders the processes of the prior art less attractive economically.

It is an object of the present invention to provide an improved process for preparing modified inorganic oxygen-containing particulate material.

This objective is achieved with a process for preparing a modified inorganic oxygen-containing particulate material comprising the steps of:

a) preparing a mixture of an aqueous suspension of inorganic oxygen-containing particulate material and an alkoxylated alcohol according to the formula

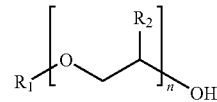

wherein $R_1$ is a $C_1$-$C_8$ alkyl, $C_4$-$C_8$ cycloalkyl or phenyl, preferably $R_1$ is a $C_1$-$C_4$ alkyl, $R_2$ is hydrogen or methyl, preferably $R_2$ is methyl, and n is an integer from 1 to 5;
b) optionally adding a first resin and/or a first resin precursor;
c) adding one or more coupling agents to the mixture;
d) optionally adding a second resin and/or a second resin precursor to the resulting mixture; and
wherein optionally water is removed at least partially from the mixture before or during step b), c) or d), or after step d); and optionally converting the first resin precursor into the first resin before, during or after step c) and/or the second resin precursor into the second resin after step d).

The process of the invention provides a modified inorganic oxygen-containing particulate material which has a good compatibility with resins. In this way, a stable dispersion of the particulate material in the resin can be achieved. A further advantage of the process of the invention is that the process generally requires fewer steps and less solvent, enabling a higher yield of inorganic particulate material per unit volume, rendering the process more efficient than conventional processes. The utilisation of the alkoxylated alcohol causes a more efficient removal of water from the mixture comprising inorganic oxygen-containing particulate material, alkoxylated alcohol, and water. The alkoxylated alcohol further has the advantage that it is compatible with most resins, rendering unnecessary the use of other solvents in which the resin is dissolved (more) easily. Consequently, the process of the invention generally is simpler, more attractive economically, and more environmentally friendly than conventional processes.

An embodiment of the invention is a process for preparing a modified inorganic oxygen-containing particulate material comprising the steps of:

a) preparing a mixture of an aqueous suspension of inorganic oxygen-containing particulate material and an alkoxylated alcohol according to the formula

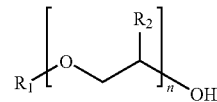

wherein $R_1$ is a $C_1$-$C_8$ alkyl, $C_4$-$C_8$ cycloalkyl or phenyl, preferably $R_1$ is a $C_1$-$C_4$ alkyl, $R_2$ is hydrogen or methyl, preferably $R_2$ is methyl, and n is an integer from 1 to 5;
b) adding a first resin and/or a first resin precursor;
c) adding one or more coupling agents to the mixture;
d) optionally adding a second resin and/or a second resin precursor to the resulting mixture; and
wherein optionally water is removed at least partially from the mixture before or during step b), c) or d), or after step d); and optionally converting the first resin precursor into the first resin before, during or after step c) and/or the second resin precursor into the second resin after step d).

If the first resin or the first resin precursor reacts with and deteriorates in the presence of water in step b) or c) of the process, water is to be removed before step b) commences.

This embodiment has the additional advantage that the inorganic oxygen-containing particulate material is functionalised with the coupling agent while the resin is present, causing the resulting inorganic particulate material to be incorporated into the resin in one step. The process of this embodiment is even simpler and hence cheaper than processes of the invention where the first resin or the first resin precursor is not added in step a).

A further embodiment of the invention is a process for preparing a modified inorganic oxygen-containing particulate material comprising the steps of:
a) preparing a mixture of an aqueous suspension of inorganic oxygen-containing particulate material and an alkoxylated alcohol according to the formula

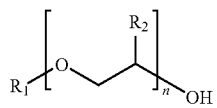

wherein $R_1$ is a $C_1$-$C_8$ alkyl, $C_4$-$C_8$ cycloalkyl or phenyl, preferably $R_1$ is a $C_1$-$C_4$ alkyl, $R_2$ is hydrogen or methyl, preferably $R_2$ is methyl, and n is an integer from 1 to 5;
b) adding one or more coupling agents to the mixture;
c) optionally adding a first resin and/or a first resin precursor to the resulting mixture; and
wherein optionally water is removed at least partially from the mixture before or during step b) or c), or after step c); and optionally converting the first resin precursor into the first resin after step c). Preferably, water is removed after step b) and/or after step c). This has the advantage that the size of the reactor can be reduced, because in steps a) and b) only the inorganic oxygen-containing particulate material is present and modified with the coupling agent. Additionally, the process results in modified inorganic oxygen-containing particulate material in alkoxylated alcohol, which can be added separately to a second resin or a second resin precursor, making it possible to prepare the modified inorganic particulate material in one location, transport it, and add it to resin in a different location.

In the context of the present invention the wording "aqueous suspension of inorganic oxygen-containing particulate material" refers to a suspension wherein at least part of the solid particles of the inorganic oxygen-containing particulate material having a dimension of between 1 and 1,000 nm in at least one direction are dispersed in an aqueous medium.

In the process of the invention water, in particular water originating from the aqueous suspension, can be removed at any time during the process. It can be removed before or during step b), c) or d), or after step d). The removal can be performed by any method known in the art, such as evacuation, distillation, distillation in combination with evacuation, and using a membrane, e.g. an ultrafiltration membrane, which is capable of selectively removing water from the mixture.

In certain applications the presence of water can deteriorate the resin. In such applications the quantity of water in the product resulting from the process of the invention generally is less than 5 percent by weight (wt %) of water, based on the total weight of the product, preferably less than 2 wt %, and most preferably less than 1 wt % of water.

Generally, in the process of the invention the various starting components are used in the following amounts:
0.1-80 wt %, preferably 0.2-65 wt % aqueous suspension of inorganic oxygen-containing particulate material;
0.1-90 wt %, preferably 0.2-70 wt % alkoxylated alcohol;
0.01-25 wt %, preferably 0.05-15 wt % coupling agent;
1-99 wt %, preferably 5-95 wt % of first and/or second resin and/or first and/or second resin precursor,
based on the total weight of aqueous suspension of inorganic oxygen-containing particulate material, alcohol, coupling agent, first and/or second resin and/or first and/or second resin precursor, where the total weight of the starting components amounts to 100 wt %.

If an inorganic oxygen-containing particulate material is selected from the group consisting of silica, alumina, aluminium trihydrate, titanium dioxide, tin oxide, indium tin oxide, and zinc oxide, the various starting components are generally used in the following amounts:
0.1-65 wt %, preferably 0.2-50 wt % aqueous suspension of inorganic oxygen-containing particulate material;
0.1-90 wt %, preferably 0.2-70 wt % alkoxylated alcohol;
0.01-25 wt %, preferably 0.05-15 wt % coupling agent;
1-99 wt %, preferably 5-95 wt % of first and/or second resin and/or first and/or second resin precursor,
based on the total weight of aqueous suspension of inorganic oxygen-containing particulate material, alcohol, coupling agent, first and/or second resin and/or first and/or second resin precursor, where the total weight of the starting components amounts to 100 wt %.

Step b) of the process of the invention is conducted such that at least part of the coupling agent reacts with the inorganic oxygen-containing particulate material. Generally, step b) is conducted at a temperature which is equal to or lower than the boiling temperature of the alkoxylated alcohol/water azeotrope. Generally, the temperature during step b) is between 0° C. and 140° C., more preferably between 10° C. and 120° C., and most preferably between 20° C. and 90° C.

The process of the invention can be conducted in a batch reactor or continuously. In one embodiment, the process of the invention is conducted in a continuous reactor comprising a membrane, the membrane allowing water and gaseous by-products to be removed from the reaction medium, while the coupling agent reacts with the inorganic oxygen-containing particulate material. In this way, products can be obtained which contain the desired amount of water and do not need any further processing to remove water, such as distillation.

The inorganic oxygen-containing particulate material can be any particulate material known to the man skilled in the art capable of forming a suspension as used in the process of the present invention, i.e. where at least part of the solid particulate material is dispersed in the aqueous medium. It is envisioned that the inorganic particulate material of the present invention may already be modified, e.g. it may contain organic constituents or be encapsulated partly or completely in a second inorganic material, before the particulate material is modified according to the processes of the invention. It is also contemplated to use an inorganic oxygen-containing particulate material comprising a core of a metal such as copper and a shell of a metal oxide as exemplified below. The inorganic oxygen-containing particulate material generally is selected from oxides, hydroxides, clays, calcium compounds, zeolites, and talc.

Examples of suitable oxides and hydroxides are silica (i.e. silicon dioxide), alumina, aluminium trihydrate, titanium dioxide, zinc oxide, iron oxide, zirconium oxide, cerium oxide, antimony oxide, bismuth oxide, cobalt oxide, dysprosium oxide, erbium oxide, europium oxide, indium oxide, indium hydroxide, indium tin oxide, magnesium oxide, neodymium oxide, nickel oxide, samarium oxide, terbium oxide, tin oxide, tungsten oxide, and yttrium oxide.

Clays typically are cationic or anionic clays. Examples of cationic clays are smectites, such as montmorillonite. Examples of anionic clays are layered double hydroxides (LDHs), such as hydrotalcite and hydrotalcite-like LDHs.

Examples of calcium compounds are calcium carbonate and calcium phosphate.

Preferred inorganic oxygen-containing particulate materials are the oxides and hydroxides, and in particular silica, alumina, aluminium trihydrate, titanium dioxide, tin oxide, indium tin oxide, and zinc oxide.

The most preferred particulate material is silica. Examples of aqueous colloidal silica are Nyacol® ex Akzo Nobel N.V., Snowtex® ex Nissan Chemicals Ltd., and Klebosol® ex Clariant.

The present invention also encompasses the modification of mixtures of two or more of the aforementioned inorganic particulate materials.

Typically, the inorganic oxygen-containing particulate materials of the invention have a number average particle diameter, as determined using a dynamic light scattering method, of between 1 and 1,000 nm, a solids content of 10 to 50 wt %. Preferably, the number average particle diameter is between 1 and 150 nm. It is envisaged that the suspension of inorganic oxygen-containing particulate material according to the invention may comprise bimodal or polymodal particle size distributions.

In a further preferred embodiment of the present invention, an aqueous suspension of inorganic oxygen-containing particulate material, and in particular an aqueous silica, which is de-ionised is used. "De-ionised" means that any free ions such as anions like $Cl^-$ and cations such as $Mg^{2+}$ and $Ca^{2+}$ are removed from the aqueous suspension to a desirable concentration using techniques known to the man skilled in the art, such as ion-exchange techniques. "Free ions" refers to ions that are dissolved in the solvent(s) and can freely migrate through the mixture. The amount of free ions typically is less than 10,000 ppm, preferably less than 1,000 ppm, and most preferably less than 500 ppm.

In the process of the invention an alkoxylated alcohol according to the formula

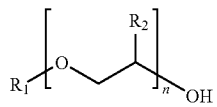

wherein $R_1$ is a $C_1$-$C_8$ alkyl, $C_4$-$C_8$ cycloalkyl or phenyl, preferably $R_1$ is a $C_1$-$C_4$ alkyl, $R_2$ is hydrogen or methyl, preferably $R_2$ is methyl, and n is an integer from 1 to 5 is suitably used. Examples of such alkoxylated alcohols are ethylene glycol mono methyl ether, ethylene glycol mono ethyl ether, ethylene glycol mono n-propyl ether, ethylene glycol mono isopropyl ether, ethylene glycol mono butyl ether, ethylene glycol mono t-butyl ether, ethylene glycol mono hexyl ether, ethylene glycol cyclohexyl ether, ethylene glycol mono phenyl ether, ethylene glycol 2-ethylhexyl ether, diethylene glycol mono methyl ether, diethylene glycol mono ethyl ether, diethylene glycol mono n-propyl ether, diethylene glycol mono isopropyl ether, diethylene glycol mono butyl ether, propylene glycol mono methyl ether, propylene glycol mono ethyl ether, propylene glycol mono propyl ether, propylene glycol mono isopropyl ether, propylene glycol mono butyl ether, propylene glycol mono t-butyl ether, propylene glycol mono hexyl ether, propylene glycol cyclohexyl ether, propylene glycol mono phenyl ether, dipropylene glycol mono methyl ether, dipropylene glycol mono ethyl ether, dipropylene glycol mono n-propyl ether, dipropylene glycol mono isopropyl ether, and dipropylene glycol mono butyl ether. Of these alcohols ethylene glycol mono methyl ether and ethylene glycol mono ethyl ether are less preferred, because they are teratogenic and may cause health problems.

The most preferred alkoxylated alcohols are propylene glycol mono methyl ether and propylene glycol mono ethyl ether. Solvents are available e.g. from Shell (Oxitol/Proxitol) and Dow (Dowanol) and Union Carbide (Carbitol/Cellosolve).

It is also envisioned to use two or more alkoxylated alcohols in the process of the invention. Furthermore, it is possible to use a solvent mixture of one or more alkoxylated alcohols and another solvent such as any of the solvents presented below. It is noted that the composition of this solvent mixture must be chosen such that the mixture is compatible with the aqueous suspension and the resin or resin precursor used in the process of the invention.

It is further envisaged to replace the alkoxylated alcohol at least partly with another suitable solvent, especially with solvents which are more compatible with the first and/or second resin or the first and/or second resin precursor and/or which do not react in the application, such as in a coating composition which comprises constituents capable of reacting with the hydroxyl group of the alkoxylated alcohol. Such solvents are known to the man skilled in the art and include ketones such as methyl amyl ketone, methyl ethyl ketone, methyl isobutyl ketone and cyclohexanone; esters such as ethyl acetate and butyl acetate; unsaturated acrylic esters such as butyl acrylate, methyl methacrylate, and trimethylol propane triacrylate; aromatic hydrocarbons such as toluene and xylene; and ethers such as dibutyl ether.

Any coupling agent capable of reacting with the inorganic oxygen-containing particulate material can be used in the process of the invention; suitable coupling agents are known to the man skilled in the art. Generally, the coupling agent of the invention comprises one or more elements selected from the group consisting of Si, Al, Ti, Zr, B, Zn, Sn, and V. Preferably, the coupling agent comprises one or more elements selected from the group consisting of Si, Al, Ti, Zr, and B.

The coupling agent of the invention generally is a coupling agent according to the formula:

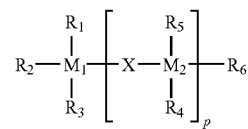

wherein $M_1$ and $M_2$ are independently selected form the group consisting of Si, Al, Ti, Zr, and B, and at least one of $R_1$-$R_6$ is independently selected from hydroxyl, chlorine, an acetoxy having between 1 and 10 carbon atoms, an alkoxy having between 1 and 20 carbon atoms, an organophosphate comprising two hydrocarbon groups comprising 1 to 20 carbon atoms, and an organopyrophosphate comprising two hydrocarbon groups comprising 1 to 20 carbon atoms, which acetoxy, alkoxy, organophosphate or organopyrophosphate optionally comprises at least one functional group, and the remaining $R_1$-$R_6$ are independently selected from hydroxyl, chlorine, a hydrocarbon having between 1 and 10,000 carbon atoms, which hydrocarbon optionally comprises at least one functional group, an acetoxy having between 1 and 5 carbon atoms, and an alkoxy having between 1 and 20 carbon atoms, which alkoxy optionally comprises at least one functional group, siloxane, and silazane, which siloxane and/or silazane optionally is a ring structure, ladder structure or cage-like structure or forms a ring, ladder or cage-like structure with any one of the remaining groups $R_1$-$R_6$; and X represents oxygen or, if $M_1$ and/or $M_2$ are Si, X represents O, N, S, disulfide, polysulfide, $R_7$—$S_4$—$R_8$ and/or $R_7$—$S_2$—$R_8$, wherein $R_7$ and $R_8$ are independently selected from a hydrocarbon having from 1 to 6 carbon atoms, and p represents an integer from 0 to 50, provided that if $M_1$ is Al or B, $R_3$ is absent and/or if $M_2$ is Al or B, $R_5$ is absent. The functional group can be any functional group known to the man skilled in the art. Examples of such functional groups are hydroxyl, epoxy, isocyanate, thiol, oligosulfides, amine, and halogen.

It is possible to use a combination of two or more coupling agents in the process of the invention. The coupling agents may be contacted with the inorganic oxygen-containing particulate material as a mixture or separately. The ratio of the coupling agents may vary as desired. It is also envisaged to change the ratio of the coupling agents over time while adding the coupling agents to the particulate material.

In a further embodiment of the invention, the coupling agent comprises at least one functional group capable of reacting with the first and/or second resin. Examples of such functional groups include hydroxyl, epoxy, isocyanate, thiol, oligosulfides, phenol, vinyl, thioether, thioester, (meth)acrylate, episulfide, thiophosphate, allyl, amine, and halogen.

In one embodiment of the process of the invention, the inorganic oxygen-containing particulate material which has been modified with at least one of the above coupling agents is subsequently modified with a further coupling agent or with a compound capable of reacting with the coupling agent attached to the particulate material. For example, the modified particulate material is treated with hexamethyl disilazane (HMDS), which renders a modified oxygen-containing particulate material that is more hydrophobic and consequently more compatible with hydrophobic matrices.

If the inorganic oxygen-containing particulate material is silica, the preferred coupling agent is a silicon-based compound. The silicon-based compound is typically selected from the group consisting of silanes, disilanes, oligomers of silane, silazane, silane-functional silicones, silane-modified resins, and silsesquioxanes. Preferred silicon-based compounds are silanes and silazanes. Silanes suitable for use in the process of the invention are those according to formulae I-VI:

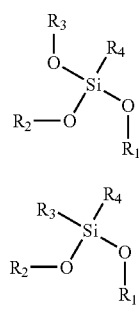

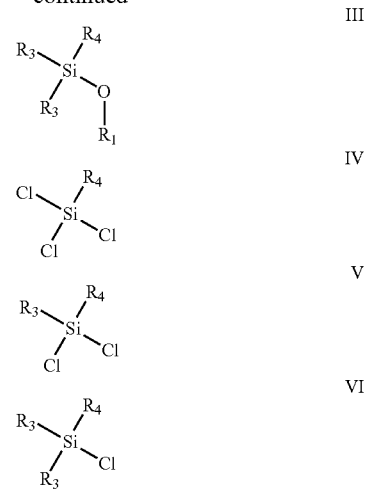

wherein each one of $R_1$, $R_2$, $R_3$, $R_4$ is independently selected from hydrogen or hydrocarbon having between 1 and 20 carbon atoms, which hydrocarbon optionally comprises one or more functional groups. If a silane according to any one of the formulae IV to VI is used in the process of the invention, the ions, and in particular Cl$^-$, are preferably removed from the mixture, for example by using ion-exchange techniques. In order to avoid an additional ion removal step, the silanes according to any one of the formulae I-III are preferred.

Examples of silanes according to the invention are tributyl methoxy silane, dibutyl dimethoxy silane, butyl trimethoxy silane, dodecyl trimethoxy silane, trimethyl chlorosilane, tributyl chlorosilane, dimethyl dichlorosilane, dibutyl dichlorosilane, methyl trichlorosilane, butyl trichlorosilane, octyl trichlorosilane, dodecyl trichlorosilane, methyl trimethoxy silane (Dynasylan® MTMS), methyl triethoxy silane (Dynasylan® MTES), propyl trimethoxy silane (Dynasylan® PTMO), propyl triethoxy silane (Dynasylan® PTEO), isobutyl trimethoxy silane (Dynasylan® IBTMO), isobutyl triethoxy silane (Dynasylan® IBTEO), octyl trimethoxy silane (Dynasylan® OCTMO), octyl triethoxy silane (Dynasylan® OCTEO), hexadecyl trimethoxy silane (Dynasylan® 9116), phenyl trimethoxy silane (Dynasylan® 9165), phenyl triethoxy silane (Dynasylan® 9265) 3-glycidyloxypropyl trimethoxy silane (Dynasylan® GLYMO), glycidyloxypropyl triethoxy silane (Dynasylan® GLYEO), 3-mercaptopropyl trimethoxy silane (Dynasylan® MTMO), 3-mercaptopropyl methyl dimethoxy silane (Dynasylan® 3403), 3-methacryloxypropyl trimethoxy silane (Dynasylan® MEMO), vinyl triethoxy silane (Dynasylan® VTEO), vinyl trimethoxy silane (Dynasylan® VTMO), vinyl tris(2-methoxyethoxy) silane (Dynasylan® VTMOEO), acetoxy propyl trimethoxy silane, methyl triacetoxy silane, 3-acryloxy propyl trimethoxy silane, 3-acryloxypropyl dimethyl methoxy silane, allyl trimethoxy silane, allyl triethoxy silane, dimethyl diethoxy silane, dimethyl dimethoxy silane, dimethyl ethoxy silane, n-hexadecyl triethoxy silane, 3-mercaptopropyl triethoxy silane, methyl dodecyl diethoxy silane, methyl-n-octadecyl diethoxy silane, methyl phenyl diethoxy silane, methyl phenyl dimethoxy silane, n-octadecyl triethoxy silane, n-octadecyl trimethoxy silane, phenyl dimethyl ethoxy silane, phenyl trimethoxy silane, trimethyl ethoxy silane, trimethyl methoxy silane, vinyl methyl diethoxy silane, octanethioic acid, S-(triethoxysilyl) propyl ester, bis (3-triethoxysilylpropyl)tetrasulfide (Si69® ex Degussa), bis (3-triethoxysilylpropyl)disulfide, gamma-mercaptopropyl trimethoxysilane (SiSiB® PC2300 ex PCC), gamma-mercaptopropyl triethoxysilane, and 3-octanoylthio-1-propyltriethoxy silane (NXT™ ex GE). Further examples of silane coupling agents can be gleaned from WO 99/09036, which silane coupling agents are incorporated herein by reference.

It is further envisaged that the silane used in the process of the invention is a mixture of two or more silanes according to any one of the formulae I-VI.

Examples of suitable disilanes are bis(2-hydroxyethyl)-3-aminopropyl-triethoxy silane, 1,2-bis(trimethoxysilyl) ethane, bis(trimethoxyl silyl ethyl)benzene, and 1,6-bis(trimethoxyl silyl)hexane.

Examples of suitable oligomers of silane are vinyl trimethoxy silane oligomer (Dynasylan® 6490), vinyl triethoxy silane oligomer (Dynasylan® 6498).

Examples of suitable silazanes are hexamethyl disilazane (Dynasylan® HMDS), tetramethyl disilazane, dimethyl cyclic silazane, 1,1,1,2,3,3,3-heptamethyl disilazane, and N-methyl silazane resin (PS117 ex Petrarch)

Examples of suitable siloxanes are 1,1,3,3-tetramethyl-1,3-diethoxy disiloxane, silanol-terminated polydimethylsiloxane (e.g. PS 340, PS 340.5, PS 341, PS 342.5 and PS 343 ex Fluorochem), diacetoxy-functionalised polydimethylsiloxane (PS 363.5 ex Fluorochem), methyldiacetoxy-functionalised polydimethylsiloxane (PS 368.5 and PS 375 ex Fluorochem), dimethylethoxy-terminated polydimethylsiloxane (PS 393 ex Fluorochem), and dimethylmethoxy-terminated polydimethylsiloxane (PS 397 ex Fluorochem).

The silane-modified resins generally are polymers containing mono-, di- or trialkoxysilyl moieties or their hydroxysilyl, acetoxysilyl or chlorosilyl counterparts, which can be prepared by introducing silicon-containing monomers during polymerisation or by modifying the resin, as will be apparent to a man skilled in the art. Preferred silane-modified resins are polymers containing mono-, di- or trialkoxysilyl moieties, because they are more stable and do not require any further processing steps to remove undesirable by-products such as acids and chlorides. Examples of such silane-modified resins are trimethoxysilyl-modified polyethylenimine (PS 076 ex Fluorochem), methyldimethoxysilyl-modified polyethylenimine (PS 076.5 ex Fluorochem), N-triethoxysilylpropyl-o-polyethylene-oxide urethane (PS 077 ex Fluorochem), and methyldiethoxysilyl-modified 1,2-polybutadiene (PS 078.8 ex Fluorochem).

Examples of suitable silsesquioxanes are polymethyl silsesquioxane (PR 6155 ex Fluorochem), polyphenyl propyl silsesquioxane (PR 6160 ex Fluorochem), and OH-functional polyphenyl propyl silsesquioxane (PR 6163 ex Fluorochem).

Other coupling agents preferred in the process of the invention are organo-metallates of titanium, aluminium, boron, and zirconium.

Examples of titanium-containing coupling agents are isopropyl isostearoyl titanate, isopropyl dimethacryl triisostearoyl titanate, isopropyl dimethacryl isostearoyl titanate, tetraisopropyl di((dioctyl)phosphito)titanate, tetra(2,2-diallyloxymethyl)butyl di((ditridecyl)phosphito)titanate, isopropyl tri((dioctyl)pyrophosphate)titanate, isopropoxy triisostearoyl titanate, di((dioctyl)pyrophosphate)oxoethylene titanate, di((dioctyl)phosphate)ethylene titanate, di((dioctyl) pyrophosphate)ethylene titanate, tetraoctyl titanate di(ditridecyl)phosphite, titanium(IV) 2,2-(bis 2-propenolatomethyl) butanolato, tris(dioctyl)pyrophospato-O, and dialkoxy bis(triethanolamine)titanate.

Examples of aluminium-containing coupling agents are diisopropyl acetoalkoxy aluminate, isopropyl diisostearoyl aluminate, and isopropyl dioctyl phosphate aluminate.

Examples of boron-containing coupling agents are trimethyl borate (TMB ex Semichem), triethyl borate (TEB ex Semichem), and tripropyl borate.

Examples of zirconium-containing coupling agents are isopropyl triisostearoyl zirconate, butyl triisostearoyl zirconate, butyl trioleyl zirconate, isopropyl trilinoleyl zirconate, di(cumyl)phenyl oxoethylene zirconate, di(cumyl)phenyl dibutyl zirconate, and tri(cumyl)phenyl propyl zirconate.

The first and second resins may be the same or different and can be any resin known to the man skilled in the art. Examples of such resins are polyaddition polymer, polyurethane, polyester, polyether, polyamide, polyurea, polyurethane-polyester, polyurethane-polyether, cellulose-based binders, such as cellulose acetobutyrate, and/or hybrid resins. Specific examples of the above resins can be found in WO 04/018115. These resins can be suitably used in the form of a solid, liquid, solution, emulsion or suspension.

The first and second resin precursors are building blocks—such as monomers, oligomers or resins—of their respective resins and can be converted into the respective first and second resins. The conversion of the first and/or second resin precursor can be carried out using any conventional process known to the man skilled in the art.

The invention further pertains to a suspension obtainable by the process of the invention comprising modified inorganic oxygen-containing particulate material and an alkoxylated alcohol according to the formula

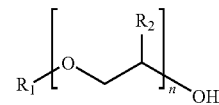

wherein $R_1$ is a $C_1$-$C_8$ alkyl or phenyl, preferably $R_1$ is a $C_1$-$C_4$ alkyl, $R_2$ is hydrogen or methyl, preferably $R_2$ is methyl, and n is an integer from 1 to 5. As the modified particulate material of the invention has a lower tendency to agglomerate compared to particulate material modified in a solvent other than the solvent of the invention, the suspension of the invention generally has an improved stability.

The amount of modified inorganic oxygen-containing particulate material generally is at least 10 wt %, preferably at least 20 wt %, and most preferably at least 25 wt %, based on the total weight of the suspension, and at most 70 wt %, preferably at most 65 wt %, and most preferably at most 60 wt %, based on the total weight of the suspension.

The invention further pertains to a dry powder of the modified inorganic oxygen-containing particulate material according to the invention. Such a dry powder can be obtained by removal of the solvent of the suspension of the invention. Removal of the solvent can be carried out according to any method known in the art. The dry powder of the invention has a reduced tendency to agglomerate compared to particulate material modified in a solvent other than the solvent of the invention. Consequently, the dry powder can be re-dispersed in a solvent while forming a smaller amount of agglomerates or no agglomerates at all. Without wishing to be bound by any theory, it is believed that the alkoxylated alcohol of the invention reacts and/or interacts with the modified oxygen-containing particulate material in order to improve the resistance to agglomeration, and that moreover the compatibility of the modified particulate material with the first and/or second resin will be enhanced.

A further advantage of the dry powders of the invention is that they can be blended with the first and/or second resin without the need for a solvent. It is also envisaged to first re-disperse the dry powders of the invention in any suitable solvent and subsequently add the resulting suspension to the first and/or second resin.

Additionally, the invention pertains to a resin composition obtainable by any one of the processes described above, comprising a modified inorganic oxygen-containing particulate material, an alkoxylated alcohol, and a first and/or second resin. For some applications it is preferred to use a resin composition from which the alkoxylated alcohol is removed using conventional methods known to the man skilled in the art. The resulting resin composition comprises a modified inorganic oxygen-containing particulate material and a first and/or second resin. The amount of inorganic oxygen-containing particulate material in the resin composition of the invention is 0.1-80 wt %, based on the amount of resin, preferably 0.2-70 wt %, and most preferably 0.5-65 wt %.

A preferred embodiment of the resin composition of the invention is constituted by so-called masterbatches, i.e. highly concentrated additive premixes, e.g. for polymer compounding, or as coating composition additive. Due to the use of the alkoxylated alcohol in the process of the invention, it is possible to prepare resin compositions with a high concentration of modified inorganic oxygen-containing particulate material, and consequently also to prepare masterbatches. Such masterbatches generally comprise between 5 and 80 wt % of resin composition, based on the total weight of the masterbatch, preferably between 15 and 75 wt %.

The resin compositions of the invention may further comprise additives conventionally used in such resin compositions. Examples of such additives are cross-linking compounds, UV stabilisers, initiators, flame retardants, catalysts, leveling agents, pigments, dyes, heat-stabilisers, anti-oxidants, fillers (such as hydroxyl apatite, silica, carbon black, glass fibres, and other inorganic materials), nucleating agents, impact modifiers, plasticisers, rheology modifiers, and degassing agents, etc. These additives can be added during the process at any suitable time and in any suitable amount, as will be apparent to the skilled person.

The suspension or the resin composition of the invention can be suitably used in coating compositions, (printing) ink formulations, adhesive tackifiers, resin-based compositions, rubber compositions, cosmetics, cleaning formulations, paper making, drilling fluids and cements, plaster formulations, non-woven fabrics, fibres, foams, orthoplastic casts, (pre-) ceramic materials, and polymer-based nanocomposite material. The suspension of the invention can further be used in polymerisation reactions such as solution polymerisation, bulk polymerisation, emulsion polymerisation, and suspension polymerisation.

A preferred embodiment is a nanocomposite material comprising a first and/or second resin and the modified inorganic oxygen-containing particulate material obtainable with the process of the invention. The term "nanocomposite material" refers to a composite material wherein at least one component comprises an inorganic phase with at least one dimension in the 1 to 1000 nanometer range. These nanocomposite materials can be prepared from the suspension or from the resin composition of the invention. Generally, the first and second resins used in the nanocomposite material of the invention are thermoplastic or thermosetting resins. Examples of suitable resins are polyethylene, polypropylene, polymethylpentene, polyvinylchloride, polymethyl(meth)acrylate, polycarbonate, and polystyrene, polystyrene acrylonitrile, polyacrylonitrile butadiene styrene, polyphenylene oxide, polysulfone, polyphenylene sulfide, polyimide, polyvinylidene fluoride, polyetherketone, and nylons such as polyamide 6, polyamide 6,6, polyamide 4,6, polyamide 11, polyamide 12, polyoxymethylene, polyvinylalcohol, polysulfides and polyesters such as polyethylene terephthalate, polypropylene terephthalate, polybutylene terephthalate, polyethylene naphthalate (PEN) and rubbers such as natural rubber, styrene-butadiene rubber, polyisoprene, polybutadiene, polyisobutylene, halogenated polyisobutylene, nitrile rubber, styrene-isoprene-styrene and similar styrenic block copolymers, poly(epichlorohydrin) rubbers, silicon rubbers, chloroprene rubber, ethylene propylene rubber, ethylene propylene diene rubber, fluorine rubbers, ethene-vinylacetate rubber, polyacrylic rubbers, polynorbornene, polyester/ether thermoplastic elastomers, phenol-formaldehyde resins, urea-formaldehyde resins, melamine-based resins, acrylic-based thermosetting resins, epoxide-based resins, diacrylate-based resins, resins containing bisphenol A derivatives or bisphenol F derivatives, polyurethane resins, unsaturated polyester compounds.

The nanocomposite material according to the invention generally has improved properties such as improved heat stability, better dimensional stability, increased flame resistance, and improved strength-to-weight ratios compared to microcomposite materials comprising conventional mineral fillers.

A further preferred embodiment is a coating composition comprising the resin composition of the present invention. Such coating compositions include solvent borne coatings, solvent-free coatings, and water borne coatings. The use of the resin composition improves the scratch resistance of the coating composition. The resin composition further may improve the mar resistance, the flame resistance, and/or the car wash resistance of the coating composition, and it generally reduces the expansion coefficient of the coating composition and/or the shrinkage of the coating composition during cure. Additionally, the amount of modified inorganic oxygen-containing particulate material in the coating compositions can be higher than conventionally used.

Resin compositions comprising silicon- or aluminium-containing particulate material are preferably used in coating compositions, as these particulate materials are readily available and economically most attractive.

The resin composition of the present invention, and in particular resin compositions comprising titanium-containing particulate material, may be used in so-called self-cleaning coating compositions, which coating compositions are cleaned by photo-oxidation of the contaminants, due to the presence of photooxidation-inducing elements, such as certain titanium-containing compounds. Another embodiment is a coating composition capable of blocking or filtering UV or IR rays, such as zinc- or titanium-containing particulate material.

A particular embodiment of the coating compositions of the present invention is formed by solvent-free coating compositions, and in particular powder coating compositions. Thus, the invention further pertains to a powder coating composition comprising the resin composition according to the present invention and a curing agent.

In powder coatings, the resin composition acts as a binder, having the capability of wetting pigments and providing cohesive strength between pigment particles and of wetting or binding to the substrate, and it melts and flows in the curing/stoving process after application to the substrate to form a homogeneous film. The first and/or second resin of the resin composition will in general be a thermosetting resin, although thermoplastic resins (based, for example, on polyamides) can, in principle, be used instead.

When the first and/or second resin is a thermosetting resin, the solid polymeric binder system generally includes a solid curing agent for the thermosetting resin; alternatively, two co-reactive film-forming thermosetting resins may be used. Suitable examples of such first and/or second resins are each selected from the group consisting of carboxy-functional polyester resins, hydroxyl-functional polyester resins, epoxy resins, and functional acrylic resins.

The solid film-forming component of the powder coating can for example be based on a solid polymeric binder system comprising a carboxy-functional polyester film-forming resin used with a polyepoxide curing agent. Such carboxy-functional polyester systems are currently the most widely used powder coatings materials. The polyester generally has an acid value in the range 10-100, a number average molecular weight Mn of 1,500 to 10,000, and a glass transition temperature Tg of from 30° C. to 85° C., preferably at least 40° C. The poly-epoxide can for example be a low molecular weight epoxy compound such as triglycidyl isocyanurate (TGIC), a compound such as diglycidyl terephthalate condensed glycidyl ether of bisphenol A or a light-stable epoxy resin. Such a carboxy-functional polyester film-forming resin can alternatively be used with a bis(beta-hydroxyalkylamide) curing agent such as tetrakis(2-hydroxyethyl) adipamide.

Alternatively, a hydroxy-functional polyester can be used with a blocked isocyanate-functional curing agent or an amine-formaldehyde condensate such as, for example, a melamine resin, a urea-formaldehyde resin, or a glycol ural formaldehyde resin, for example the material "Powderlink 1174" supplied by the Cyanamid Company, or hexahydroxymethyl melamine. A blocked isocyanate curing agent for a hydroxy-functional polyester may for example be internally blocked, such as the uretdione type, or it may be of the caprolactam-blocked type, for example isopherone diisocyanate.

A further possibility is to use an epoxy resin with an amine-functional curing agent such as, for example, dicyandiamide. Instead of using an amine-functional curing agent for an epoxy resin, a phenolic material can be used, preferably a material formed by reaction of epichlorohydrin with an excess of bisphenol A (that is to say, a polyphenol made by adducting bisphenol A and an epoxy resin). A functional acrylic resin, for example a carboxy-, hydroxy- or epoxy-functional resin, can be used with an appropriate curing agent.

Yet another possible film forming component of a powder coating is a solid acrylic resin having a glass transition temperature in the range 45 to 70° C. and a molecular weight in the range 1,500 to 16,000. Acrylic resins of this type can have either a carboxylic acid functionality, with acid values in the range 35 to 240 g/mol KOH, or a hydroxyl functionality, with hydroxyl values in the range 35-100 g/mol KOH, and may be combined with any of the range of curatives used for carboxyl- and hydroxyl-functional polyesters. Such products are exemplified by, but not restricted to, the products of Johnson Polymer. Alternatively, a solid acrylic resin suitable as a film forming polymer in powder coatings can have a glycidyl functionality with an epoxy equivalent weight in the range 250-1100 g/equivalent, and is exemplified by the products of among others the Anderson Development Company and Reichhold Chemicals Inc. Glycidyl-functional acrylic polymers are most typically combined with difunctional carboxyl-functional curatives, for example 1,12-dodecandioic acid, but may also be reacted with any of the range of curatives available for bisphenol-A-epoxy resins.

Mixtures of film-forming polymers can be used; for example, a carboxy-functional polyester can be used with a carboxy-functional acrylic resin and a curing agent such as a bis(beta hydroxyalkylamide) which serves to cure both polymers. Further possibilities for mixed binder systems are a carboxy-, hydroxy- or epoxy-functional acrylic resin used with an epoxy resin or a polyester resin (carboxy- or hydroxy-functional). Such resin combinations may be selected so as to be co-curing, for example a carboxy-functional acrylic resin co-cured with an epoxy resin, or a carboxy-functional polyester co-cured with a glycidyl-functional acrylic resin. More usually, however, such mixed binder systems are formulated so as to be cured with a single curing agent (for example, use of a blocked isocyanate to cure a hydroxy-functional acrylic resin and a hydroxy-functional polyester). Another preferred formulation involves the use of a different curing agent for each binder of a mixture of two polymeric binders (for example, an amine-cured epoxy resin used in conjunction with a blocked isocyanate-cured hydroxy-functional acrylic resin).

Other film-forming polymers which may be mentioned include functional fluoropolymers, functional fluorochloropolymers, and functional fluoroacrylic polymers, each of which may be hydroxy-functional or carboxy-functional and may be used as the sole film-forming polymer or in conjunction with one or more functional acrylic, polyester and/or epoxy resins, with appropriate curing agents for the functional polymers.

Other curing agents which may be mentioned include epoxy phenol novolacs and epoxy cresol novolacs; isocyanate curing agents blocked with oximes, such as isopherone diisocyanate blocked with methyl ethyl ketoxime, tetramethylene xylene diisocyanate blocked with acetone oxime, and Desmodur W (dicyclohexylmethane diisocyanate curing agent) blocked with methyl ethyl ketoxime; light-stable epoxy resins such as "Santolink LSE 120" supplied by Monsanto; and alicyclic poly-epoxides such as "EHPE-3150" supplied by Daicel.

Powder coatings are generally manufactured as follows: separately weighed out components, in particular resins and optional other materials, are premixed. The premix is then subjected to melt extrusion to homogenise all components. The mixture is extruded, generally in the form of a sheet, the sheet is cooled down and granulated (chipped), after which the particles are reduced (micronised) to the proper size for powder coatings.

Alternatively, the other materials may be incorporated into the powder coating composition at a later stage, e.g., during a grinding step or after grinding. The exact manner in which the other components are to be added to the powder coating composition will depend on the nature of the component, and will be known to the skilled person.

The powder coating composition of the present invention will also contain other components conventional in the art of powder coating manufacture, such as one or more of curing agents, colouring agents, fillers, fluidity-assisting agents, plasticisers, UV stabilisers, and anti-gassing agents. How, when, and in what amounts these compounds should be used is within the scope of the person skilled in the art of powder coatings.

Colouring agents include pigments or dyes. Examples of pigments which can be used are inorganic pigments such as titanium dioxide, red and yellow iron oxides, chrome pigments, and carbon black and organic pigments such as, for example, phthalocyanine, azo, anthraquinone, thioindigo, isodibenzanthrone, triphendioxane, and quinacridone pigments. Dyes can be used instead of or as well as pigments.

If so desired, one or more fluidity-assisting agents may be incorporated into the powder coating composition by dry-blending, for example the fluidity-assisting agents disclosed in WO 94/11446, and especially the preferred additive combination disclosed in that reference, which comprises aluminium oxide and aluminium hydroxide, preferably in proportions in the range from 30:70 to 70:30. The amount of fluidity-assisting agent(s) incorporated by dry blending may be in the range of from, for example, 0.05 or 0.1 to 5% by weight, based on the total weight of the composition without the additive(s).

The particle size distribution of the powder coating composition may be in the range of from 0 to 150 microns, generally up to 120 microns, with a mean particle size in the range of from 15 to 75 microns, preferably at least 20 to 25 microns, advantageously not exceeding 50 microns, more especially 20 to 45 microns.

The powder coating composition obtained by the process of the present invention can, in principle, be applied to a substrate by any of the processes of powder coating technology, for example by electrostatic spray coating (corona-charging or tribo-charging), or by fluidised-bed or electrostatic fluidised-bed processes.

Advantageously, as is known in the art, the substrate is chemically or mechanically cleaned prior to application of the powder coating composition. Also, the substrate is preferably subjected to anodisation and/or chemical treatment, for example by means of a chromate-based conversion coating or chromic acid pickling. Other possible chemical pre-treatments include treatment with iron sulfate or zinc phosphate.

After application of the powder coating composition to a substrate, conversion of the resulting adherent particles into a continuous coating (including, where appropriate, curing of the applied composition) may be effected by heat treatment and/or by radiant energy, notably infra-red, ultra-violet or electron beam radiation. Powder coatings are usually applied in film thicknesses of 5-200 microns, preferably 10-100 microns, more preferably 15-80 microns.

The powder coating particles which do not adhere to the substrate can be recovered for re-use, so that powder coatings are economical in use of ingredients. Also, powder coating materials generally are free of added solvents and, in particular, do not use organic solvents and accordingly are non-polluting. The invention also pertains to a process for providing a substrate with a coating wherein the substrate is provided with a powder coating composition according to the present invention, followed by curing, and to the coated substrate thus obtained.

The present invention will be illustrated in the following Examples.

EXAMPLES

In the experiments below a deionised aqueous colloidal silica ex Akzo Nobel was used. The colloidal silica possesses a specific surface area of 190-210 $m^2$/gram as determined by a method described by G. W. Sears in "Determination of Specific Surface Area of Colloidal Silica By Titration With Sodium Hydroxide", *Anal. Chem.*, 28, 1956, 1981-83).

Example 1

125.0 grams of Nyacol 2034DI (ex Akzo Nobel), 51.14 grams of 1,6-hexanediol diacrylate (ex Across), 312 grams of ethyl proxitol (1-ethoxy-2-propanol ex Shell), and 23.1 grams (0.15 mole) of vinyl trimethoxy silane (ex Across) were added to a 500 ml round-bottomed flask equipped with a mechanical stirrer, a reflux condenser, a thermometer, and a distillation unit.

The temperature was raised to 70° C., after which the pressure was reduced to 10 mbar over a period of 5 hours. After the solvent and water were distilled off, the resulting resin was cooled to room temperature and diluted with 1,6-hexanediol diacrylate to a 15 wt % modified silica-containing resin. The product was highly transparent and possessed a viscosity of 0.02 Pa·s at 5 Pa as determined using a cone and plate rotational rheometer (TA Instruments AR 2000) at 23° C.

Example 2

899.7 grams of Nyacol 2034DI (ex Akzo Nobel), 418.9 grams of 1,6-hexanediol diacrylate (ex Across), 2,249 grams of ethyl proxitol (ex Shell), and 178.3 grams (0.72 mole) of MEMO (ex Across) were added to a 5,000 ml round-bottomed flask equipped with a mechanical stirrer, a reflux condenser, a thermometer, and a distillation unit. The temperature of the mixture was raised to 65° C., after which the pressure was reduced to 10 mbar over a period of 6 hours, with the solvent and water being distilled off.

The resulting product was highly transparent and possessed a viscosity of 2.17 Pa·s at 5 Pa as determined using a cone and plate rotational rheometer (TA Instruments AR 2000) at 23° C.

Example 3

2,016.4 grams of Nyacol 2034DI (ex Akzo Nobel) and 3,109.0 grams of ethyl proxitol (ex Shell) were weighed into a 6 liter round-bottomed flask equipped with a mechanical stirrer, a thermometer, and a distillation unit. The temperature was raised to 37° C. and the vacuum was reduced to 60 mbar, at which a solvent/water mixture was distilled off. The pressure was slowly reduced to 40 mbar in order to remove most of the water. Distilling was stopped as a solid content of 30 wt % was reached. Next the organosol was filtered over a paper filter to remove large particles.

End values: solid content: 30.5 wt % (determined using a Scaltec SMO 01 at 140° C.). Percentage water: 2.2 wt %

2,274.30 grams of the organosol, containing 693.66 grams of silica, were weighed into a 3 liter round-bottomed flask equipped with a mechanical stirrer, a thermometer, a distilling unit, and a dosing unit. The temperature was raised to approximately 65° C. Next a homogeneous solution of 327.78 grams (2.21 moles) of vinyl trimethoxy silane (ex Across), 119.49 grams (6.63 moles) of water, and 394 grams of Ethyl Proxitol (ex Shell) was added over a period of 2 hours. After stirring for 3.5 hours the pressure was reduced to 350 mbar in order to distill off a water/solvent mixture. The pressure was gradually reduced over 2 hours to 200 mbar resulting in silica dispersion containing 33.5 wt % solids. Next Hyflo Super Cell was added and the dispersion was then filtered over a Hyflo Super Cel at 650 mbar. The filtered bed was next rinsed with extra solvent, resulting in a silica dispersion containing 29.6 wt % modified silica (determined using a Scaltec SMO 01 at 140° C.).

Example 4

Into a 6 liter 4-necked round-bottomed flask equipped with a mechanical stirrer, a thermometer, a dosing unit, and a distilling unit 2,271.3 grams of Nyacol 2034DI and 3,407 grams of ethyl proxitol were weighed. The temperature was raised to 45° C., at which 369.20 grams (2.49 moles) of vinyl trimethoxy silane were added over a period of 100 minutes. After 45 minutes the temperature was raised to 55° C. and the pressure was reduced to 155 mbar in order to distill off a water/solvent mixture. The pressure was gradually reduced to 116 mbar over a period of 12 hours, resulting in a modified nano-silica dispersion containing 49.2 wt % solids (determined using a Scaltec SMO 01 at 140° C.).

Next 35 grams of Hyflo Super Cell were added and the dispersion was diluted with ethyl proxitol to a solid content of 40.2 wt %. The dispersion was next filtered over a paper filter.

Example 5

Organosol Based on Propoxylated Ethanol

Into a 6,000 ml 4-necked round-bottomed flask equipped with a mechanical stirrer, a thermometer, and a distillation unit 6.00 kg of Nyacol 2034 DI (ex Akzo Nobel) containing 34 wt % solids were weighed together with 660 grams of propoxylated ethanol (Ethyl Proxitol ex Shell Chemicals). Next 8,200 grams of Ethyl Proxitol were run in over a period of 17 hours while distilling off an azeotrope of water/solvent. The temperature was kept between 40 and 50° C. while the pressure was slowly reduced to 50 mbar. The obtained organosol was filtered over a P2-glassfilter in order to remove large silica particles. The organosol had a solid content of 34.4 wt % silica (determined by evaporating all solvents at 140° C. using a Scaltec SMO 01).

The water content was 0.57 wt % as determined using the Karl Fisher method.

Example 6

Organosol Based on Propoxylated Methanol

Into a 2,000 ml 4-necked round-bottomed flask equipped with a mechanical stirrer, a thermometer, and a distillation unit 700 grams of Nyacol 2034 DI (ex Akzo Nobel) containing 34.4 wt % solids were weighed together with 1,050 grams of propoxylated methanol (Dowanol PM ex DOW Chemicals). The temperature was raised to 50° C. while the pressure was reduced to 104 mbar in order to distill off a water/solvent azeotrope over a period of 7 hours. The obtained organosol was filtered over a P2-glass filter in order to remove large silica aggregates.

The organosol had a solid content of 33.9 wt % silica (determined by evaporating all solvents at 140° C. using a Scaltec SMO 01). The water content was 6.25 wt % as determined using the Karl Fisher method.

Example 7

Organosol Based on Ethoxylated N-Propanol

Into a 5,000 ml 4-necked round-bottomed flask equipped with a mechanical stirrer, a reflux condenser, and a distillation unit 3,068.80 grams of Nyacol 2034DI (ex Akzo Nobel) and 2,141.0 grams of ethoxylated n-propanol (ex Aldrich) were weighed. The temperature was raised to 42° C. while the pressure was reduced to 75 mbar in order to distill off a water/solvent mixture.

After 1 hour the pressure was reduced to 70 mbar and an additional 671.6 grams of solvent were added, followed by 255 grams of solvent after an extra 2.5 hours.

After 4 hours the pressure was reduced to 65 mbar and the whole was kept at that pressure for another 5 hours. Subsequently, the pressure was reduced to 15 mbar and the temperature was raised to 50° C. for 1 hour. The product was then filtered over a P2-glass filter in order to remove large silica aggregates.

The organosol had a solid content of 34.3 wt % silica (determined by evaporating all solvents at 140° C. using a Scaltec SMO 01)

The water content was 0.37 wt % as determined using the Karl Fisher method.

Example 8

Modification of an Ethyl Proxitol Based Organosol with Octyl Trimethoxy Silane

Into a 1,000 ml 4-necked round-bottomed flask equipped with a mechanical stirrer, a thermometer, and a distillation unit 455.00 grams of the organosol of Example 5 containing 156.52 grams of colloidal silica were weighed. The temperature was raised to 65° C. Next a homogeneous solution of 58.35 grams of octyl trimethoxy silane (ex Across), 58.35 grams of distilled water, and 233.40 grams of Ethyl Proxitol (ex Shell Chemicals) was dosed over a period of 1 hour. Under reduced pressure a solvent/water mixture was distilled off over a period of 5 hours. The pressure was slowly reduced from 300 to 10 mbar until an organosol with a solid content of 30 wt % modified silica (determined with a Scaltec SMO 01) was obtained.

Example 9

Modification of an Ethyl Proxitol Based Organosol with Isobutyl Trimethoxy Silane Into a 500 ml 4-necked round-bottomed flask equipped with a mechanical stirrer, a thermometer, and a distillation unit 301.07 grams of the organosol of Example 5 containing 103.27 grams of colloidal silica, 48.22 grams (0.270 mole) of isobutyl trimethoxy silane (Dynasylan IBTMO ex Degussa) were weighed. The temperature was raised to 65° C. and kept there for 5 hours. Subsequently, a solvent/water mixture was distilled off under reduced pressure over a period of 0.75 hour, until an organosol with a solid content of 45.7 wt % of modified silica particles (determined by evaporating all solvents at 140° C. using a Scaltec SMO 01) remained.

Example 10

Modification of an Ethyl Proxitol Based Organosol with (Mercaptopropyl)Trimethoxy Silane Into a 4-necked round-bottomed flask equipped with a mechanical stirrer, a distillation unit, and a thermometer 300 grams of the organosol of Example 5 containing 102.9 grams of colloidal silica were weighed. 52.73 grams (0.269 mole) of mercaptopropyl)trimethoxy silane (ex Aldrich) were added together with 0.07 gram of maleic acid and 3.93 grams of water. The reaction mixture was heated to 65° C. for 5 hours while slowly distilling off, under reduced pressure, a mixture of water/solvent.

The remaining organosol had a solid content of 48.3 wt % silica (determined by evaporating all solvents at 140° C. using a Scaltec SMO 01).

Example 11

Modification of an Ethyl Proxitol Based Organosol with Vinyl Trimethoxy Silane 2,274.30 grams of Ethyl Proxitol based organosol prepared in accordance with Example 5, except that the organosol contained 30.5 wt % of colloidal silica, containing 693.66 grams of silica, were weighed into a 3 liter round-bottomed flask equipped with a mechanical stirrer, a thermometer, a distilling unit, and a dosing unit. The temperature was raised to approximately 65° C. Next a homogeneous solution of 327.78 grams (2.21 moles) of vinyl trimethoxy silane (ex Across), 119.49 grams (6.63 moles) of water, and 394 grams of Ethyl Proxitol (ex Shell Chemicals) was added over a period of 2 hours. After stirring for 3.5 hours, the pressure was reduced to 350 mbar in order to distill off a water/solvent mixture. The pressure was gradually reduced to 200 mbar in 2 hours, resulting in silica dispersion containing 33.5 wt % solids.

Next Hyflo Super Cel was added and the dispersion was then filtered over a Hyflo Super Cel at 650 mbar. The filtered bed was next rinsed with extra solvent, resulting in a silica dispersion containing 29.6 wt % modified silica (determined at 140° C. using a Scaltec SMO 01 at 140° C.).

Example 12

Modification of an Ethyl Proxitol Based Organosol with Phenyl Triethoxy Silane

Into a 1,000 ml 4-necked round-bottomed flask equipped with a mechanical stirrer, a thermometer, and a distillation unit 722.03 grams of an Ethyl Proxitol based organosol prepared in accordance with Example 5 except that the organosol contained 35.5 wt % of colloidal silica (256.32 grams), 153 grams of Ethyl Proxitol, and 107.21 grams of phenyl triethoxy silane (ex Aldrich) were weighed. The temperature was raised to 65° C. and kept there for 5 hours.

Under reduced pressure a part of the solvents (ethanol/Ethyl Proxitol) was distilled off, resulting in an organosol containing 36.9 wt % modified nano-silica (determined at 140° C. using a Scaltec SMO 01).

Example 13

Modification of an Ethyl Proxitol Based Organosol with Propyl Trimethoxy Silane

Into a 250 ml 3-necked round-bottomed flask equipped with a mechanical stirrer, a thermometer, and a distillation unit 129.28 grams of an Ethyl Proxitol based organosol prepared in accordance with Example 5 except that the organosol contained 30.7 wt % of colloidal silica (39.69 grams) were weighed. The reaction mixture was heated to 110° C. Next a mixture containing 20.80 grams (0.127 mole) of propyl trimethoxy silane (ex Aldrich), 8.20 grams of water, and 61.60 grams of Ethyl Proxitol was dosed over a period of 2.5 hours under reduced pressure in order to distill off methanol. Next the temperature was raised to 125° C. and a part of the solvent was distilled off, resulting in an organosol with a solid content of 30.5 wt % of modified silica particles (determined by evaporating all solvents at 140° C. using a Scaltec SMO 01) remaining.

Example 14

Dynasylan 3221 Modified Nano-Silica from an Aqueous Colloidal Silica

Into a 500 ml 4-necked round-bottomed flask equipped with a mechanical stirrer, a distillation unit, and a thermometer 250 grams of Nyacol 2034DI containing 86.0 grams of silica were weighed together with 375 grams of Ethyl Proxitol. The reaction mixture was heated to 65° C. Next 37.45 grams (0.1645 mole) of Dynasylan 3221, 3,3'-bis(triethoxysilylpropyl)tetrasulfide, were added over a period of 3 hours. After an additional 3 hours the pressure was reduced in order to distill off a water/solvent mixture.

The obtained organosol had a solid content of 37.7 wt % of modified nano-silica (determined by evaporating all solvent at 140° C. using a Scaltec SMO 01).

Example 15

Vinyl Trimethoxy Silane Modified Nano-Silica from an Aqueous Colloidal Silica

Into a 6 liter 4-necked round-bottomed flask equipped with a mechanical stirrer, a thermometer, a dosing unit, and a distilling unit 2,271.3 grams of Nyacol 2034DI and 3,407 grams of Ethyl Proxitol were weighed. The temperature was raised to 45° C., at which 369.20 grams (2.49 moles) of vinyl trimethoxy silane were added over a period of 100 minutes. After 45 minutes the temperature was raised to 55° C. and the pressure was reduced to 155 mbar in order to distill off a water/solvent mixture. The pressure was gradually reduced further to 116 mbar over a period of 12 hours, resulting in a modified nano-silica dispersion containing 49.2 wt % solids (determined using a Scaltec SMO 01 at 140° C.).

Next 35 grams of Hyflo Super Cel medium (Fluka) were added and the dispersion was diluted with Ethyl Proxitol to a solid content of 40.2 wt %. The dispersion was filtered over a paper filter in order to remove large aggregates.

Example 16

Propyl Trimethoxy Silane Modified Nano-Silica from an Aqueous Colloidal Silica

Into a 500 ml 4-necked round-bottomed flask equipped with a mechanical stirrer, a distillation unit, and a thermometer 91.62 grams of Nyacol 2034DI (ex Akzo Nobel) containing 31.52 grams of nano-silica and 137.43 grams of Ethyl Proxitol were weighed. The temperature was raised to 65° C. Next a mixture containing 16.52 grams (0.101 mole) of propyl trimethoxy silane, 5.43 grams of water, and 18.53 grams of Ethyl Proxitol was dosed over a period of 1.5 hours. Part of the solvents were distilled off under reduced pressure until an organosol with a solid content of 40.5 wt % of modified nano-silica (determined by evaporating all solvent at 140° C. using a Scaltec SMO 01) remained.

Example 17

Dynasylan MEMO Modified Nano-Silica from an Aqueous Colloidal Silica

Into a 1,000 ml 4-necked round-bottomed flask equipped with a mechanical stirrer, a distillation unit, and a thermometer 350.00 grams of Nyacol 2034DI (ex Akzo Nobel) containing 120.40 grams of nano-silica, 18.86 grams (0.076 mole) of Dynasylan MEMO (3-methacryloxypropyl trimethoxy silane), and 525.00 grams of Ethyl Proxitol were weighed. The temperature was raised to 65° C. After 2 hours a vacuum was applied in order to distill off a water/solvent mixture. After 5 hours the reaction was stopped. The reaction mixture was filtered over 6 grams of Hyflo Super Cel Medium (ex Acros) in order to remove large aggregates.

An organosol with a solid content of 31.2 wt % of modified nano-silica (determined by evaporating all solvent at 140° C. using a Scaltec SMO 01) remained.

Example 18

Mixing of Dynasylan MEMO Modified Nano-Silica Particles in an Ethyl Proxitol Based Organosol with HDDA 1.863 grams of 1,6-hexanediol diacrylate were mixed with 0.329 gram of the organosol of Example 17. Under reduced pressure the solvent was evaporated, leaving a modified resin containing 15 wt % of modified nano-silica.

The obtained product was highly transparent and possessed a viscosity of 0.02 Pa·s at 5 Pa as determined with a cone and plate rotational rheometer (TA Instruments AR 2000) at 23° C. The resulting resin composition maintained the same viscosity for at least 3 months.

Example 19

Modification of Setal 291 with OCTMO Modified Silica Particles

Into a 1,000 ml 4-necked round-bottomed flask equipped with a mechanical stirrer, a thermometer, and a distillation unit 455.00 grams of an organosol prepared in accordance with Example 1, except that the organosol contained 34.3 wt % of colloidal silica, were weighed. The temperature was raised to 65° C. Next a mixture of 58.35 grams of octyl trimethoxy silane (ex Aldrich), 58.35 grams of water, and 233.40 grams of Ethyl Proxitol was added. After 5 hours a vacuum was applied in order to distill off a part of the solvent. An organosol with a solid content of 30.2 wt % of modified nano-silica (determined by evaporating all solvent at 140° C. using a Scaltec SMO 01) remained.

628.73 grams of the organosol together with 193.37 grams of Setal 291, a high solid alkyd containing 1% volatiles, were weighed into a 1 liter 4-necked round-bottomed flask equipped with a mechanical stirrer, a thermometer, and a distillation unit. The temperature was raised to 45° C. and the mixture was stirred for 45 minutes. A part of the solvent was distilled off under reduced pressure. The end product contained 61.9 wt % solids as determined by evaporating all solvent at 140° C. using a Scaltec SMO 01.

Example 20

Vinyl Trimethoxy Siilane Modified Nano-Silica Particles in 1,6-Hexanediol Diacrylate Into a 500 ml 4-necked round-bottomed flask equipped with a mechanical stirrer, a thermometer, and a distillation unit 125.0 grams of Nyacol 2034DI (ex Akzo Nobel) containing 43.00 grams of colloidal silica, 51.14 grams of 1,6-hexanediol diacrylate (ex Acros), 0.20 gram of 2,6-di-t-butyl-p-cresol, 312 grams of Ethyl Proxitol (ex Shell Chemicals), and 23.10 grams (0.15 mole) of vinyl trimethoxy silane (ex Acros) were weighed.

The temperature was raised to 70° C. and next the pressure was slowly reduced, over a period of 5 hours, to 10 mbar while distilling off all solvent and water. The resin was then cooled to 23° C. and diluted with 1,6-hexanediol diacrylate to a 15 wt % modified silica-containing resin.

The obtained product was highly transparent and possessed a viscosity of 0.02 Pa·s at 5 Pa as determined with a cone and plate rotational rheometer (TA Instruments AR 2000) at 23° C. The resulting resin composition maintained the same viscosity for at least 3 months.

Example 21

MEMO Modified Nano-Silica Particles in 1,6-Hexanediol Diacrylate

Into a 500 ml 4-necked round-bottomed flask equipped with a mechanical stirrer, a thermometer, and a distillation unit 107.30 grams of Nyacol 2034DI (ex Akzo Nobel) containing 36.48 grams of nano-silica, 40.96 grams of 1,6-hexanediol diacrylate (ex Acros), 268.25 grams of Ethyl Proxitol (ex Shell Chemicals), 0.04 gram of maleic acid (ex Aldrich), 0.16 gram of 2,6-di-t-butyl-p-cresol, and 7.29 grams (0.029 mole) of MEMO (ex Acros) were weighed.

The temperature was raised to 65° C. and kept there for 5 hours. Subsequently, the pressure was slowly reduced in order to distill of all solvent and water. Modified 1,6-hexanediol diacrylate containing 50 wt % modified nano-silica was obtained. The material possessed a viscosity of 0.085 mPa·s at 5 Pa as determined with a cone and plate rotational rheometer (TA Instruments AR 2000) at 23° C.

Example 22

MEMO Modified Nano-Silica Particles in 1,6-Hexanediol Diacrylate

Into a 250 ml 3-necked round-bottomed flask equipped with a mechanical stirrer, a thermometer, and a distillation unit 60.00 grams of Nyacol 2034DI (ex Akzo Nobel) containing 20.40 grams of nano-silica, 54.60 grams of 1,6-hexanediol diacrylate (ex Acros), 151.70 grams of Dowanol PM ex Dow Chemicals, 0.05 gram of maleic acid (ex Aldrich), 0.22 gram of 2,6-di-t-butyl-p-cresol, and 4.89 grams (0.0197 mole) of MEMO (ex Acros) were weighed.

The temperature was raised to 65° C. and kept there for 5 hours. Subsequently, the pressure was slowly reduced in order to distill of all solvent and water. Modified 1,6-hexanediol diacrylate containing 30 wt % modified nano-silica was obtained.

Example 23

MEMO Modified Nano-Silica Particles in 1,6-Hexanediol Diacrylate

Into a 250 ml 3-necked round-bottomed flask equipped with a mechanical stirrer, a thermometer, and a distillation unit 55.00 grams of Nyacol 2034DI (ex Akzo Nobel) containing 18.70 grams of nano-silica, 50.05 grams of 1,6-hexanediol diacrylate (ex Acros), 189.00 grams of ethoxylated n-propanol (ex Aldrich), 0.05 gram of maleic acid (ex Aldrich), 0.20 gram of 2,6-di-t-butyl-p-cresol, and 4.49 grams (0.018 mole) of MEMO (ex Acros) were weighed.

The temperature was raised to 65° C. and kept there for 5 hours. Subsequently, the pressure was slowly reduced in order distill of all solvent and water. Modified 1,6-hexanediol diacrylate containing 30 wt % modified nano-silica was obtained.

Example 24

Into a 6,000 ml 4-necked round-bottomed flask equipped with a mechanical stirrer, a thermometer, and a distillation unit 1213.20 grams of Nyacol 2034DI (ex Akzo Nobel) containing 417.34 grams of colloidal silica, 3740.40 grams of Dowanol PM, and 780.52 grams of a resin prepared in accordance with Example 2 of U.S. Pat. No. 6,096,835 were charged. Under reduced pressure (52 mbar at 37° C.) 260 grams of a water/Dowanol PM mixture were distilled off, resulting in a slightly bluish solution. Next 233.24 grams (1.573 moles) of vinyl trimethoxy silane were added at a temperature of 35° C. Under reduced pressure a solvent/water mixture was distilled off over a period of 8 hours until a solid content of 60 wt % was obtained.

427 grams of butyl acetate were added and the temperature was raised in order to distill off Dowanol PM (bp=116° C.); after collecting 470 grams of distillate an extra 240 grams of butyl acetate were added. Next, the temperature of the suspension was raised to 130° C. until another 260 grams were distilled off. The resin was next diluted with 103.2 grams of butyl acetate to a solid content of 68.5 wt % (determined in a circulation oven at 140° C. for 30 minutes).

Example 25

MEMO Modified Aluminum Oxide Nano-Particles in 1,6-Hexanediol Diacrylate

Into a 250 ml 3-necked round-bottomed flask equipped with a mechanical stirrer, a thermometer, and a distillation unit 74.76 grams of Ethyl Proxitol (ex Shell Chemicals), 0.19 gram (0.152 mmole) of MEMO (ex Acros), and 59.76 grams (0.246 mole) of 1,6-hexanediol diacrylate (ex Acros) and 0.17 gram of 2,6-di-t-butyl-p-cresol were weighed. Next 6.00 grams of NanoByk 3600 (ex BYK-Chemie Gmbh), containing 3.03 grams of aluminum oxide nano particles, were slowly added under vigorous mixing.

The temperature was raised to 65° C. and kept there for 5 hours. Subsequently, the pressure was slowly reduced until all solvent had evaporated. The end product contained a 5 wt % stable dispersion of modified aluminum oxide nano-particles in 1,6-hexanediol diacrylate.

Example 26

MEMO Modified Titanium (IV) Oxide Nano Articles in Ethyl Proxitol

Into a 250 ml 3-necked round-bottomed flask equipped with a mechanical stirrer, a thermometer, and a distillation unit 50.00 grams of Ethyl Proxitol (ex Shell Chemicals), 0.52 gram (0.210 mmole) of MEMO (ex Acros), and 30.00 grams containing 3.00 grams of titanium (IV) oxide nano-particles (ex Aldrich) were weighed.

The temperature was raised to 65° C. and kept there for 5 hours. Subsequently, the pressure was slowly reduced until all solvent had evaporated. The end product contained a 4.1 wt % dispersion of modified titanium (IV) oxide in Ethyl Proxitol. Nano-particles settle over time but can be re-dispersed easily by stirring.

Example 27

TYZOR ZEC Modified Nano-Silica Particles in Ethyl Proxitol

Into a 250 ml 3-necked round-bottomed flask equipped with a mechanical stirrer, a thermometer, and a distillation unit 80.00 grams of an Ethyl Proxitol based organosol prepared in accordance with Example 5 except that the organosol contained 35.5 wt % of colloidal silica (28.40 grams), 11.28 grams (solid content is 59.5 wt %) of Tyzor ZEC, a diethylcitrate chelated Zirconate ex DuPont, and 50.00 grams of Ethyl Proxitol were weighed.

The temperature was raised to 65° C. and kept there for 5 hours. Subsequently, the pressure was slowly reduced until all solvent had evaporated. The end product contained a 24.4 wt % dispersion of modified nano-silica in Ethyl Proxitol. Nano-particles, on a 10 wt % level, gave highly transparent resins in Setalin V442 (ex Akzo Nobel) and a resin prepared in accordance with Example 2 of U.S. Pat. No. 6,096,835.

Example 28

TYZOR AA 105 Modified Nano-Silica Particles in Ethyl Proxitol

Into a 250 ml 3-necked round-bottomed flask equipped with a mechanical stirrer, a thermometer, and a distillation unit 60.00 grams of an Ethyl Proxitol based organosol prepared in accordance with Example 1 except that the organosol contained 35.5 wt % of colloidal (21.30 grams) nano-silica, 5.94 grams (solid content is 59 wt %) of Tyzor AA105 (CAS no. 68568-02-7 ex DuPont), and 80.00 grams of Ethyl Proxitol were weighed.

The temperature was raised to 65° C. and kept there for 5 hours. Subsequently, the pressure was slowly reduced until all solvent had evaporated. The end product contained a 16.5 wt % dispersion of modified nano-silica in Ethyl Proxitol. Nano-particles, at a 10 wt % level, gave highly transparent yellow coloured resins in Setalin V442 (ex Akzo Nobel), HDDA (ex Aldrich), and a resin prepared in accordance with Example 2 of U.S. Pat. No. 6,096,835.

Example 29

Lica 38 Modified Nano-Silica Particles in Ethyl Proxitol

Into a 250 ml 3-necked round-bottomed flask equipped with a mechanical stirrer, a thermometer, and a distillation unit 80.00 grams of an Ethyl Proxitol based organosol prepared in accordance with Example 5 except that the organosol contained 35.5 wt % of colloidal silica (28.40 grams), 5.92 grams (solid content 95 wt %) of Lica 38 (CAS no. 103432-54-8 ex Kenrich Petrochemicals), and 80.00 grams of Ethyl Proxitol were weighed.

The temperature was raised to 65° C. and kept there for 5 hours. Subsequently, the pressure was slowly reduced until all solvent had evaporated. The end product contained a 19.5 wt % dispersion of modified nano-silica in Ethyl Proxitol.

Nano-particles, on a 10 wt % level, gave highly transparent resins in Setalin V442 (ex Akzo Nobel) and a resin prepared in accordance with Example 2 of U.S. Pat. No. 6,096,835.

Example 30

Solvent Transfer

Into a 5 liter 4-necked round-bottomed flask equipped with a mechanical stirrer, a thermometer, a dosing unit, and a distilling unit 1306.9 grams of Nyacol 2034DI, containing 449.57 grams of colloidal silica, and 1,960.35 grams of Dowanol PM ex Shell Chemicals were weighed. The temperature was raised to 65° C., at which a mixture of 235.60 grams (1.434 moles) of propyl trimethoxy silane, 77.44 grams of water, and 259.16 grams of Dowanol PM was added over a period of 1 hour.

875 grams of a solvent/water mixture were distilled off over a period of 5 hours under reduced pressure. 1040 grams of butyl acetate were added and the temperature was raised to 115° C. Over a period of 5.5 hours solvents (Dowanol PM/water) were distilled off while an extra 580 grams of butyl acetate were added during the distillation, resulting in a butyl acetate based organosol containing 59.0 wt % modified silica nano-particles (determined by evaporating all solvent at 140° C. using a Scaltec SMO 01).

The percentage of Dowanol PM as determined with a gas chromatograph was lower than 0.6 wt %.

Example 31

Vinyl Trimethoxy Silane Modified Nano-Silica Particles in Tripropylene Glycol Diacrylate Into a 500 ml 4-necked round-bottomed flask equipped with a mechanical stirrer, a distillation unit, and a thermometer 56.00 grams of Nyacol 2034DI (ex Akzo Nobel) containing 17.36 grams of nano-silica, 30.97 grams of tripropylene glycol diacrylate (ex Aldrich), 9.33 grams (0.063 mole) of vinyl trimethoxy silane (ex Aldrich), and 140.00 grams of Ethyl Proxitol (ex Shell Chemicals) were weighed. The temperature was raised to 65° C. and kept there for 4 hours. Subsequently, the pressure was reduced to 236 mbar in order to distill off the water/solvent mixture. The pressure was slowly reduced over a period of 3 hours to 18 mbar in order to distill off all solvents.

The obtained end product was highly transparent and possessed a viscosity of 0.055 Pa·s at 5 Pa as determined with a cone and plate rotational rheometer (TA Instruments AR 2000) at 23° C.

Comparative Example 32

Vinyl Trimethoxy Silane Modified Nano-Silica Particles In Tripropyleneglycol Diacrylate Into a 500 ml 4-necked round-bottomed flask equipped with a mechanical stirrer, a distillation unit, and a thermometer 63.40 grams of Nyacol 2034DI (ex Akzo Nobel) containing 19.65 grams of nano-silica, 35.06 grams of tripropylene glycol diacrylate (ex Aldrich), 10.56 grams (0.071 mole) of vinyl trimethoxy silane (ex Aldrich), and 158.50 grams of isopropanol were weighed. The temperature was raised to 65° C. and kept there for 4¾ hours. Subsequently, the pressure was reduced to 436 mbar in order to distill off a water/solvent mixture. After 1½ hours the pressure was reduced further in order to distill off all solvents. A highly viscous gel was obtained.

In comparison with Example 31, which is in accordance with the present invention, using a solvent of the invention results in a low-viscous and well-dispersed resin composition, whereas using isopropanol as solvent causes the formation of a gel. Hence the resin composition of Example 31 can be handled and processed far more easily than the composition of Example 32.

Example 33

A glycidyl-functional acrylic polymer was prepared by charging 441 grams of methyl isobutyl ketone (MIBK) into a 3 liter, 5-necked round-bottomed flask equipped with a stirrer, a thermometer, a nitrogen inlet, and a reflux condenser and then heating under a constant nitrogen blanket to the boiling point of the MIBK. Once a steady reflux temperature was attained, a mixture of 295.2 grams of methyl methacrylate, 114.8 grams of 2-ethylhexyl acrylate, 205 grams of styrene, 410 grams of glycidyl methacrylate, and 24.9 grams of azo-di-(2-methylbutyronitrile) was added over a period of 3 hours. Once the addition was completed, 2 grams of t-butyl peroxybenzoate in 10 g of MIBK were added, with reflux being maintained for a further 2 hours. The reaction mixture was cooled until reflux stopped and the condenser changed to a distillation set-up, after which the flask was heated and the MIBK removed, initially at atmospheric pressure and finally at reduced pressure, using a vacuum pump. During distillation the reaction product was allowed to increase in temperature to 180-190° C.; once distillation ceased it was discharged to an aluminium tray and allowed to cool.

The reaction product was a solid glycidyl-functional polymer with the following characteristics:

| Solid content: | 99.1% |
| Epoxy equivalent weight: | 367 g/mol |
| 200° C. cone and plate viscosity: | 56 p |
| Number average molecular weight (by gpc): | 6,835 |

Into a 500 ml 4-necked round-bottomed flask equipped with a mechanical stirrer, a thermometer, and a distilling unit 60.00 grams of Nyacol 2034DI, 57.28 grams of the solid glycidyl-functional polymer, and 259 grams of Dowanol PM (methoxy 2-propanol ex DOW Chemicals) were weighed.

The non-homogeneous dispersion was heated to 30° C. and under reduced pressure 66 grams of a water/Dowanol PM mixture were distilled off, resulting in a homogeneous solution.

Next 0.05 gram of maleic acid was weighed in and a mixture of 11.09 grams (0.075 mole) of vinyl trimethoxy silane in 11 grams of Dowanol PM was added over a period of 1 hour. The temperature was gradually increased to 50° C. and the pressure reduced to 30 mbar over a period of 2 hours, with solvent being distilled off. After 50 minutes the reaction was stopped.

Example 34

An acrylic clear powder coating was prepared using the components and amounts shown in Table 1.

TABLE 1

| Component | Weight |
|---|---|
| Product of Example 33 | 741.6 g |
| Dodecandioic acid | 236.9 g |
| Actiron NX3P[1] | 1.8 g |
| Modaflow III[2] | 16.9 g |
| Benzoin | 3 g |

[1]Actiron NX3P is 2,4,6-tri(dimethylaminoethyl)phenol 60% w/w absorbed on a mineral base from Synthron
[2]Modaflow III is an acrylic flow modifier 65% absorbed on silica from UCB chemicals A clear powder coating was manufactured by combining the components of Table 1 as a dry mix in a blender and then feeding them into a twin screw extruder operating at a temperature of 115° C. The extrudate was rolled flat on a chilled plate and broken up into chips which were ground in an impact mill and sieved through a 106 micron mesh to yield a powder coating.

The resulting powder coating was applied electrostatically to untreated aluminium panels and cured in oven set at 140° C. for 30 minutes to form clear glossy coatings with film thicknesses of between 50-70 μm.

Example 35

The process for preparing the polyester resin is conducted in two stages:
Stage 1

| Ingredient | weight (g) | moles |
|---|---|---|
| Terephthalic acid | 1128.8 | 6.8 |
| Neopentyl glycol | 673.9 | 6.5 |
| Mono ethylene glycol | 44.6 | 0.72 |
| Tri-methylol propane | 32.4 | 0.24 |

The above ingredients, together with 2 g of Fascat 4100, a processing catalyst, were charged to a 5 liter round-bottomed flask equipped with a stirrer, a precondenser (to minimise glycol loss), a main water-cooled condenser, a Dean and Stark water trap, a thermometer, and a nitrogen gas inlet.

The stirred reaction mixture was heated progressively to 250° C. over 4 hours and held at 250° C. until the mixture became clear and the acid number of the polymer was below 20 mg KOH/g.
Stage 2
The second stage of the reaction was carried out as follows:
The mixture was cooled to 200° C. before a sample was taken and the Hydroxyl content (OH V) was measured and compared to the theoretical Hydroxyl Value (52.1) to determine the glycol loss.

To correct the glycol loss, neopentyl glycol was added to the reactor together with

| Isophthalic acid | 132.8 g | 0.80 mole |
|---|---|---|
| Adipic acid | 58.4 g | 0.40 mole. |

The stirred mixture was re-heated to 235° C. and the reaction was maintained under a nitrogen blanket until approximately 270 g of water had collected in the Dean & Stark separator.

At this point the reaction mixture was cooled to 225° C. and maintained at this temperature for one hour while a partial vacuum (of about 28 inches of mercury) was applied in order to remove any residual trace of water.

The reaction was allowed to proceed until an acid value of approximately 35 mgKOH/g was reached.

At this point the vacuum was released and the polymer was cooled to 190° C., discharged into a stainless steel tray, and allowed to cool to room temperature, at which point it yielded a brittle transparent solid with the following properties.

| Melt viscosity @ 200° C. (ICI Cone & Plate viscometer) | 60 poise |
|---|---|
| Acid number | 33.0 mg/KOH/g |
| Hydroxyl number | 5.5 mg/KOH/g |
| Tg | 62.5° C. |
| Number average molecular weight (calculated) | 3,594 |

Into a 250 ml 3 necked round-bottomed flask equipped with a mechanical stirrer, a distilling unit, and a thermometer 39.51 grams of the polyester resin and 158.04 grams of methyl ethyl ketone were weighed. The polyester resin was dissolved at 65° C., after which the organosol (prepared in a manner similar to the procedure described in Example 1) containing 34.3 wt % unmodified nano-silica particles in ethyl proxitol was combined with 3.99 grams (0.027 mole) of vinyl trimethoxy silane (exAcross). The solvent was removed in an oven at 170° C. at 20 mbar.

Example 36

A powder coating comprising primid as curing agent was prepared from the following ingredients

| Ingredient | weight (g) |
|---|---|
| Polyester resin of Example 35 | 64.9 |
| Primid | 3.4 |
| Titanium dioxide | 30.0 |
| BYK360P | 1.4 |
| Benzoin | 0.3 |

A white glossy finish was produced by combining the components as a dry blend and premixing them prior to feeding into a twin screw extruder at a barrel temperature between 120° C.-130° C.

The extrudate was rolled flat, chilled, and broken up to produce a "chip". This was ground in an impact mill and sieved through a 106 micron mesh to yield a powder coating.

This powder coating was applied electrostatically, Using a GemaPG 1 gravity feed gun, to bonderised aluminium panels and stoved in an electric oven at 200° C. for 10 minutes (metal temperature). The resulting film was a clear glossy coating having a film thickness of 50-70 μm.

Example 37

A powder coating comprising a polyester resin and an epoxy resin was prepared from the following ingredients:

| Ingredient | weight (g) |
|---|---|
| Polyester resin of Example 35 | 41.2 |
| Epoxy resin (type 3)[1] | 16.8 |
| Titanium dioxide | 34.0 |
| Blanc fixe | 6.0 |
| Cure accelerator[2] | 0.3 |
| Benzoin | 0.2 |
| Polyethylene wax | 0.3 |
| BYK360P[3] | 1.2 |

A powder was produced and applied following the process as outlined in Example 36.

This powder was applied to degreased, iron phosphated steel panels and stoved at 180° C. for 15 minutes (metal temperature) to produce a smooth, glossy film. The resulting film was a clear glossy coating having a film thickness of 50-70 μm.

The invention claimed is:
1. A process for preparing a modified colloidal silica particulate material comprising the steps of:
   a) providing a de-ionised aqueous suspension of silica particulate material;
   b) preparing a mixture of said de-ionised aqueous suspension of silica particulate material and an alkoxylated alcohol according to the formula

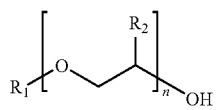

wherein $R_1$ is a $C_1$-$C_8$ alkyl, $C_4$-$C_8$ cycloalkyl or phenyl, $R_2$ is hydrogen or methyl, and n is an integer from 1 to 5; and c) adding to the mixture one or more coupling agents comprising one or more elements selected from the group consisting of Si, Al, Ti, Zr, B, Zn, Sn, and V; and allowing at least part of said one or more coupling agents to react with said silica particulate material;

wherein water is removed at least partially from the mixture during or after step c);

to obtain a suspension of modified silica particulate material in alkoxylated alcohol, said modified silica particulate material being present in an amount from 10 to 70 wt % based on the obtained suspension, the process further comprising adding a first resin and/or a first resin precursor to the mixture from step b) prior to step c).

2. A process for preparing a modified colloidal inorganic oxygen-containing particulate material comprising the steps of:

a) preparing a mixture of an aqueous suspension of inorganic oxygen-containing particulate material and an alkoxylated alcohol according to the formula

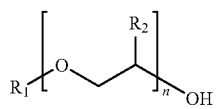

wherein $R_1$ is a $C_1$-$C_8$ alkyl, $C_4$-$C_8$ cycloalkyl or phenyl, $R_2$ is hydrogen or methyl, and n is an integer from 1 to 5; and b) adding to the mixture one or more coupling agents comprising one or more elements selected from the group consisting of Si, Al, Ti, Zr, B, Zn, Sn, and V; and allowing at least part of said one or more coupling agents to react with said inorganic oxygen-containing particulate material;

wherein water is removed at least partially from the mixture during or after step b); and wherein the suspension of inorganic oxygen-containing particulate material is aqueous silica which is de-ionised prior to step a);

to obtain a suspension of modified inorganic oxygen-containing particulate material in alkoxylated alcohol, said modified inorganic oxygen-containing particulate material being present in an amount from 10 to 70 wt % based on the obtained suspension, the process further comprising adding a first resin and/or a first resin precursor to the mixture from step a) prior to step b).

3. The process according to claim 1 wherein the first resin precursor is added to the mixture in step b) and wherein the first resin precursor is converted into a resin after step b).

4. The process according to claim 1, wherein the amount of water present in the obtained mixture is less than 5 wt %, based on the total mixture.

5. The process according to claim 2, wherein the amount of water present in the obtained mixture is less than 2 wt %, based on the total mixture.

6. The process according to claim 2, wherein the amount of water present in the obtained mixture is less than 1 wt %, based on the total mixture.

7. The process according to claim 2, further comprising adding a second resin and/or a second resin precursor to the mixture after the step of obtaining a modified inorganic oxygen-containing particulate material in alkoxylated alcohol.

8. A process for preparing a modified silica particulate material comprising the steps of:

a) providing a de-ionised aqueous suspension of silica particulate material;

b) preparing a mixture of said de-ionised aqueous suspension of silica particulate material having a number average particle diameter of between 1 and 1,000 nm, an alkoxylated alcohol according to the formula

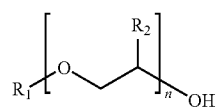

where $R_1$ is a $C_1$-$C_8$ alkyl, $C_4$-$C_8$ cycloalkyl or phenyl, $R_2$ is hydrogen or methyl, and n is an integer from 1 to 5, and one or more coupling agents comprising a silicon-based compound; and c) allowing at least part of said one or more coupling agents to react with said silica particulate material, wherein water is removed at least partially from the mixture during or after step c);

to obtain a suspension comprising said modified silica particulate material in said alkoxylated alcohol, the process further comprising adding a first resin and/or a first resin precursor to the mixture from step b) prior to step c), said modified silica particulate material being present in an amount from 10 to 70 wt % based on the total weight of the obtained suspension.

9. The process according to claim 8 wherein the alkoxylated alcohol is selected from the group consisting of propylene glycol mono methyl ether, propylene glycol mono ethyl ether, and mixtures thereof.

10. The process according to claim 8 wherein the silicon-based compound is selected from the group consisting of silanes, disilanes, oligomers of silane, silazane, silane-functional silicones, silane-modified resins, and silsesquioxanes.

11. The process according to claim 8 wherein the number average particle diameter is between 1 and 150 nm.

12. The process according to claim 8 wherein the product resulting from the process contains less than 5 wt % of water, based on the total weight of the product.

13. A process for preparing a modified silica particulate material comprising the steps of:

a) providing a de-ionised aqueous suspension of silica particulate material;

b) preparing a mixture of said de-ionised aqueous suspension of silica particulate material, an alkoxylated alcohol according to the formula

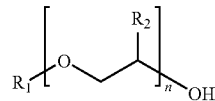

where $R_1$ is a $C_1$-$C_8$ alkyl, $C_4$-$C_8$ cycloalkyl or phenyl, $R_2$ is hydrogen or methyl, and n is an integer from 1 to 5, and one or more coupling agents;

c) allowing at least part of said one or more coupling agents to react with said silica particulate material, wherein water is removed at least partially from the mixture during or after step c);

to obtain a suspension comprising said modified silica particulate material in said alkoxylated alcohol, said modified silica particulate material being present in an amount from 10 to 70 wt % based on the total weight of the obtained suspension, the process further comprising adding a first resin and/or a first resin precursor to the mixture from step b) prior to step c).

14. The process according to claim 13 wherein the alkoxylated alcohol is selected from the group consisting of propylene glycol mono methyl ether, propylene glycol mono ethyl ether, and mixtures thereof.

15. The process according to claim 13 wherein the coupling agent is a silicon-based compound.

16. The process according to claim 15 wherein the silicon-based compound is selected from the group consisting of silanes, disilanes, oligomers of silane, silazane, silane-functional silicones, silane-modified resins, and silsesquioxanes.

17. A process for preparing a modified inorganic oxygen-containing particulate material comprising the steps of:
   a) preparing a mixture of an aqueous suspension of inorganic oxygen-containing particulate material, an alkoxylated alcohol according to the formula

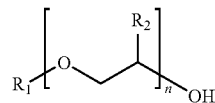

where $R_1$ is a $C_1$-$C_8$ alkyl, $C_4$-$C_8$ cycloalkyl or phenyl, $R_2$ is hydrogen or methyl, and n is an integer from 1 to 5, and one or more coupling agents;

b) allowing at least part of said one or more coupling agents to react with said inorganic oxygen-containing particulate material, wherein water is removed at least partially from the mixture during or after step b); and wherein the aqueous suspension of inorganic oxygen-containing particulate material is aqueous silica which is de-ionised prior to step a);

to obtain a suspension comprising said modified inorganic oxygen-containing particulate material in said alkoxylated alcohol, said modified inorganic oxygen-containing particulate material being present in an amount from 10 to 70 wt % based on the total weight of the obtained suspension, and wherein the aqueous silica which is de-ionised contains free ions in an amount of less than 1,000 ppm the process further comprising adding a first resin and/or a first resin precursor to the mixture from step a) prior to step b).

* * * * *